United States Patent
Katou et al.

(10) Patent No.: US 6,817,237 B2
(45) Date of Patent: Nov. 16, 2004

(54) TIRE CONDITION MONITORING APPARATUS

(75) Inventors: Michiya Katou, Ogaki (JP); Yasuhiro Miwa, Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 10/628,138

(22) Filed: Jul. 25, 2003

(65) Prior Publication Data

US 2004/0069056 A1 Apr. 15, 2004

(30) Foreign Application Priority Data

Jul. 25, 2002 (JP) ........................................ 2002-217085

(51) Int. Cl.[7] .............................................. G01M 17/02
(52) U.S. Cl. ...................................... 73/146.5; 340/447
(58) Field of Search ............................... 73/146, 146.5; 340/440, 442, 447

(56) References Cited

U.S. PATENT DOCUMENTS 5,335,540 A    8/1994  Bowler et al. ............. 73/146.5
6,340,929 B1 *  1/2002  Katou et al. ................. 340/447
6,450,021 B1 *  9/2002  Katou et al. ............... 73/146.5
6,604,415 B2 *  8/2003  Imao et al. ................. 73/146.5

* cited by examiner

Primary Examiner—Edward Lefkowitz
Assistant Examiner—Andre Allen
(74) Attorney, Agent, or Firm—Sheridan Ross PC

(57) ABSTRACT

A transmitter has a tire condition sensor, a transmission circuit, a voltage sensor and an electricity control circuit. The tire condition sensor detects the condition of a tire. The voltage sensor detects a voltage of the battery. During a period from when the tire condition sensor detects the condition of the tire to when the transmission circuit starts transmitting the data, the electricity control circuit performs a transmission preparation process to gradually increase electricity supplied to the transmission circuit from a battery, thereby gradually increasing a radio wave output of the transmission circuit. If the value of the voltage detected by the voltage sensor is lowered to a lowest operation voltage of the transmitter during the transmission preparation process, the electricity control circuit limits the supply of electricity to the transmission circuit from the battery.

11 Claims, 3 Drawing Sheets

TIRE CONDITION MONITORING APPARATUS

BACKGROUND OF THE INVENTION

The present invention relates to a tire condition monitoring apparatus that wirelessly transmits conditions of a tire including the air pressure of the tire to a receiver.

Wireless tire condition monitoring apparatuses that allow a driver in a vehicle passenger compartment to check the conditions of vehicle tires have been proposed. A typical monitoring system includes transmitters and a receiver. Each transmitter is located in the wheel of one of the tires and the receiver is located in the body frame of the vehicle. Each transmitter detects the conditions, such as air pressure and the temperature of the associated tire, and wirelessly transmits the detected information to a receiver. The receiver receives data from the transmitters and displays the conditions of the tires, for example, on a display located in front of the driver's seat.

As shown in FIG. 6, a prior art transmitter 100 includes a pressure sensor 101, a temperature sensor 102, a voltage sensor 103, a transmission controller 104, a transmission circuit 105, and an antenna 106. These devices are driven by a battery 107. The pressure sensor 101 measures the internal air pressure of a tire. The temperature sensor 102 measures the internal temperature of the tire. The voltage sensor 103 measures the voltage of the battery 107. The transmission controller 104 wirelessly transmits the air pressure data, the temperature data, and the voltage data to a receiver (not shown) through a transmission circuit 105 and the antenna 106. In this manner, the transmitter 100 monitors the voltage and transmits the voltage data to the receiver. The receiver displays the voltage, thereby informing a passenger about the voltage of the battery 107.

When the life of the battery 107 expires, the transmitter 100 cannot operate. Therefore, it is necessary that a passenger in the passenger compartment be able to confirm the life of the battery 107 in the transmitter 100. The transmitter 100 thus transmits the voltage data together with data representing the tire conditions. When the voltage represented by the voltage data is equal to or less than a predetermined determination value, the receiver determines that the life of the battery has expires and shows the determination result, for example, on a display device (not shown).

If the voltage of the transmitter 100 is lowered below a lowest operating voltage of the transmitter 100, the operation of the transmitter 100 will be unstable and the contents of transmitted data will be unreliable. Also, every transmission of transmission data lowers the voltage of the battery 107 and consumes the battery while repeating unstable operations. This lowers the reliability of data transmitted by the transmitter 100.

The voltage of the battery 107 varies significantly depending on the environment in which the battery 107 is used. In a temperature range about 20° C., the voltage of the battery 107 is maintained equal to or more than the operational voltage of the transmitter 100 (for example, equal to or more than 2V). In an extremely low temperature range of, for example, −40° C., chemical reactions in the battery 107 are suppressed. Thus, when a great current is needed for transmission, the lowest operation voltage of the transmitter cannot be maintained, and the transmission can be stopped. In this case, if the data transmission is performed, the voltage of the battery 107 is further lowered and consumes the battery 107, which unnecessarily consumes the electricity. If the temperature about the battery 107 is increased to a temperature level that allows the transmitter 100 to perform transmission, a significant amount of electricity has already been unnecessarily consumed. The life of the battery 107 is therefore shortened.

SUMMARY OF THE INVENTION

Accordingly, it is an objective of the present invention to provide a tire condition monitoring apparatus that reliably performs transmission by maintaining a voltage that permits a transmitter to operate even if the voltage of a battery is lowered.

To achieve the foregoing and other objectives and in accordance with the purpose of the present invention, a tire condition monitoring apparatus for monitoring a condition of a vehicle tire is provided. The apparatus includes a transmitter and a receiver. The transmitter is located in the tire and activated by a battery. The transmitter includes a tire condition sensor, a transmission circuit, a voltage sensor, and an electricity control circuit. The tire condition sensor detects the condition of the tire. The transmission circuit wirelessly transmits data representing the tire condition. The voltage sensor detects a voltage of the battery. During a period from when the tire condition sensor detects the condition of the tire to when the transmission circuit starts transmitting the data, the electricity control circuit performs a transmission preparation process to gradually increase electricity supplied to the transmission circuit from the battery, thereby gradually increasing a radio wave output of the transmission circuit. If the value of the voltage detected by the voltage sensor is lowered to a lowest operation voltage of the transmitter during the transmission preparation process, the electricity control circuit limits the supply of electricity to the transmission circuit from the battery. The receiver is located in a body of the vehicle and receives data from the transmitter.

In another aspect of the present invention, a transmitter that is located in a tire of a vehicle and activated by a battery is provided. The transmitter includes a tire condition sensor, a transmission circuit, a voltage sensor, and an electricity control circuit. The tire condition sensor detects the condition of the tire. The transmission circuit wirelessly transmits data representing the tire condition. The voltage sensor detects a voltage of the battery. During a period from when the tire condition sensor detects the condition of the tire to when the transmission circuit starts transmitting the data, the electricity control circuit performs a transmission preparation process to gradually increase electricity supplied to the transmission circuit from the battery, thereby gradually increasing a radio wave output of the transmission circuit. If the value of the voltage detected by the voltage sensor is lowered to a lowest operation voltage of the transmitter during the transmission preparation process, the electricity control circuit limits the supply of electricity to the transmission circuit from the battery.

The present invention also provides another transmitter, which is located in a tire of a vehicle and activated by a battery. The transmitter includes a tire condition sensor, a transmission circuit, a voltage sensor, and an electricity control circuit. The tire condition sensor detects the condition of the tire. The transmission circuit wirelessly transmits data representing the tire condition. The voltage sensor detects a voltage of the battery. After the tire condition sensor detects the condition of the tire, the electricity control circuit gradually increases electricity supplied to the transmission circuit from the battery, thereby gradually increasing a radio wave output of the transmission circuit. If the value of the voltage detected by the voltage sensor reaches a lowest operation voltage before the value of the radio wave output reaches a predetermined value, the electricity control circuit limits the supply of electricity to the transmission circuit from the battery, such that the transmission circuit performs transmission at a radio wave output that is less than the predetermined value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
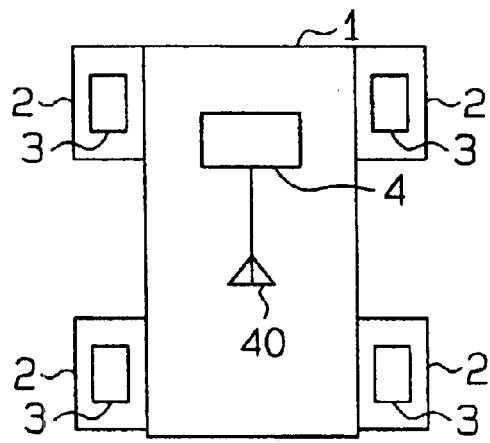
FIG. 1 is a diagrammatic view showing a tire condition monitoring apparatus according to one embodiment of the present invention.

A tire condition monitoring apparatus according to one embodiment of the present invention will now be described with reference to FIGS. 1 to 5. As shown in FIG. 1, the tire condition monitoring apparatus includes four transmitters 3 and a receiver 4. Each transmitter 3 is located in one of four tires 2 of a vehicle 1. The receiver 4 is located on a body frame of the vehicle 1. Each transmitter 3 is located in the corresponding tire 2 and is fixed to a wheel of the tire 2. Each transmitter 3 measures the condition of the corresponding tire 2, that is, the internal air pressure and the internal temperature of the tire 2. The transmitter 3 then wirelessly transmits data representing the measured tire conditions to the receiver 4. The receiver 4 is located at a predetermined position on the body frame of the vehicle 1. The receiver 4 receives the signal wirelessly transmitted by each transmitter 3 and processes the received signal.

Figure 2:
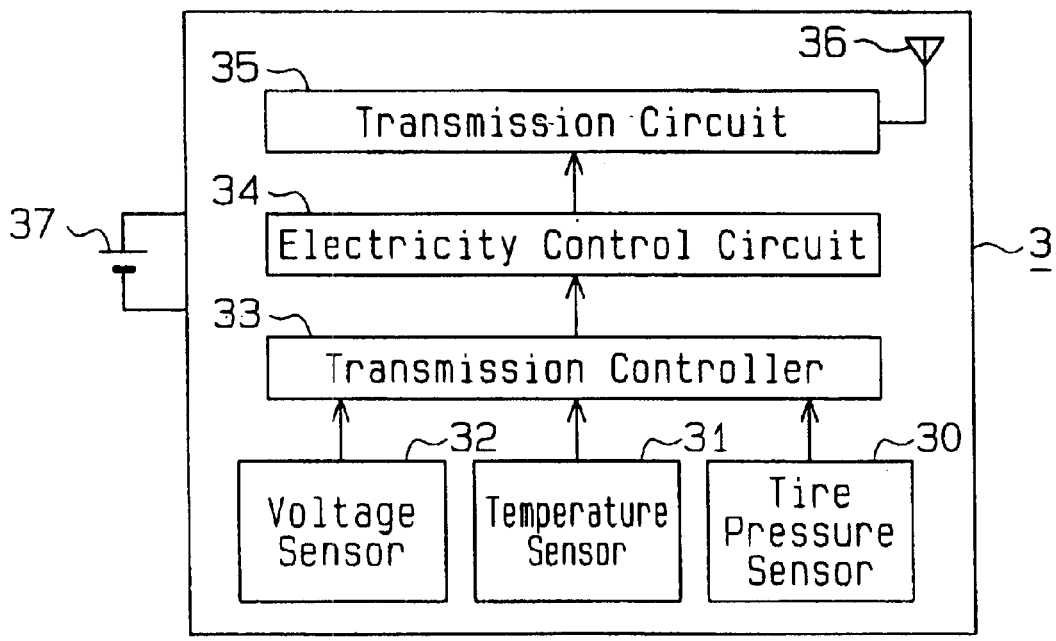
FIG. 2 is a block diagram showing a transmitter of the monitoring apparatus shown in FIG. 1.
Figure 3:
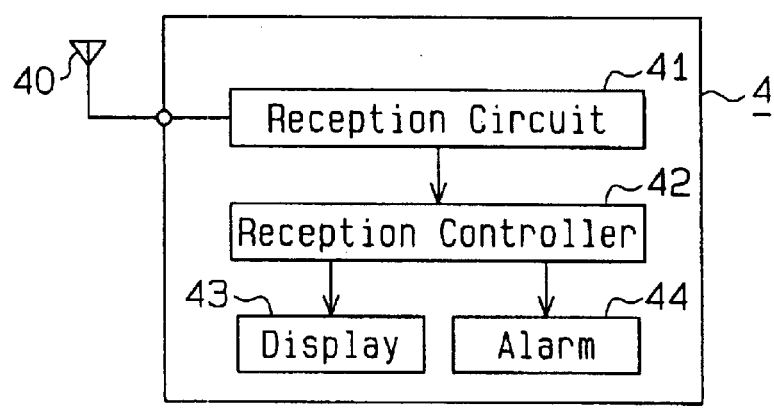
FIG. 3 is a block diagram showing a receiver of the monitoring apparatus shown in FIG. 1.

FIG. 2 is a block diagram of one of the transmitters 3. FIG. 3 is a block diagram of the receiver 4.

As shown in FIG. 2, each transmitter 3 includes a pressure sensor 30, a temperature sensor 31, a voltage sensor 32, a transmission controller 33, an electricity control circuit 34, a transmission circuit 35, and an antenna 36. The pressure sensor 30 and the temperature sensor 31 function as a tire condition sensor. A battery 37 is a drive source of these devices. The sensors 30, 31, 32, the transmission controller 33, and the transmission circuit 35 are driven by the battery 37. The transmission controller 33 is, for example, a microcomputer and includes a central processing unit (CPU), a random access memory (RAM), and a read only memory (ROM). Predetermined identification data (a specific identification code) is registered in each transmission controller 33. The ID codes permit the receiver 4 to distinguish the transmitters 3.

The tire pressure sensor 30 measures the air pressure in the interior of the associated tire 2 and provides the transmission controller 33 with pressure data, which is obtained from the measurement. The temperature sensor 31 measures the temperature in the interior of the associated tire 2 and provides the transmission controller 33 with temperature data, which is obtained from the measurement. The voltage sensor 32 measures the voltage of the battery 37, and provides the transmission controller 33 with voltage data, which is obtained from the measurement.

The transmission controller 33 sends data containing the air pressure data, the temperature data, the voltage data, and the ID code to the transmission circuit 35 through the electricity control circuit 34.

The electricity control circuit 34 monitors the voltage of the battery 37 based on signals from the voltage sensor 32. If necessary, the electricity control circuit 34 limits supply of electricity from the battery 37.

The transmission circuit 35 encodes and modulates the data sent from the transmission controller 33 through the electricity control circuit 34. The transmission circuit 35 then wirelessly sends a signal including the data to the receiver 4 through the antenna 36.

As shown in FIG. 3, the receiver 4 includes an antenna 40, a reception circuit 41, a reception controller 42, a display 43, and an alarm 44. These devices are driven by a battery (not shown) mounted on the vehicle 1. The reception controller 42 is, for example, a microcomputer and includes a central processing unit (CPU), a random access memory (RAM), and a read only memory (ROM).

The reception circuit 41 receives data transmitted by the transmitters 3 through the reception antenna 40. The reception circuit 41 demodulates and decodes the received signals to obtain data, which is then transmitted to the reception controller 42. Based on data from the reception circuit 41, the reception controller 42 obtains the internal air pressure and the internal temperature of the tire 2 corresponding to the transmitter 3 that has sent data, and the voltage of the battery 37 in the transmitter 3 that has sent data.

The reception controller 42 causes the display 43 to show information including the internal air pressure and the internal temperature and the voltage of the battery 37. The display 43 is located in the view of a passenger driver of the vehicle 1. The reception controller 42 also causes the alarm 44 to inform a passenger abnormalities of the internal air pressure and the internal temperature, and an abnormality of the voltage of the battery 37. The alarm 44 may be a device that generates sound for indicating abnormalities or a device that emits light for indicating abnormalities. The abnormalities of the internal air pressure and the internal temperature of tires 2, and an abnormality of the batteries 37 of the tires 2 may be shown on the display 43.

Figure 4:
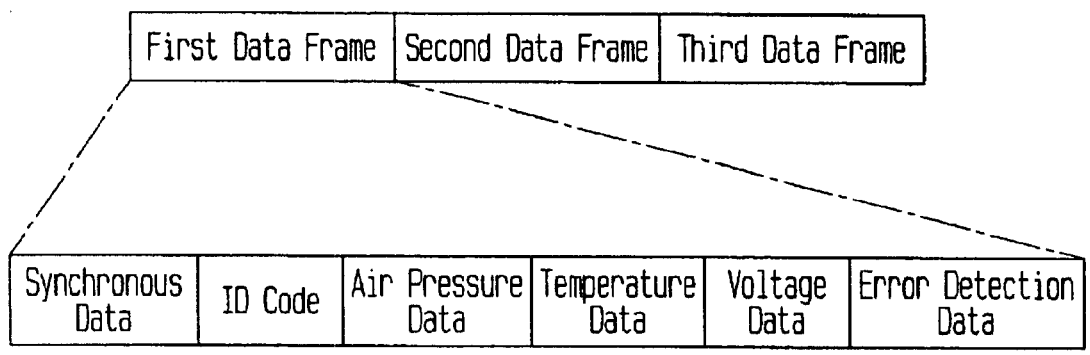
FIG. 4 is a diagram showing the structure of transmission data.

FIG. 4 shows an example of the structure of a signal transmitted by each transmitter 3. As shown in FIG. 4, the transmission signal includes consecutive first to third data frames. Each data frame includes six types of data, that is, synchronous data, the ID code, the air pressure data, the temperature data, the voltage data, and error detection code. The synchronous data represents the head of the corresponding data frame. The ID code is specific to each transmitter 3. The pressure data and the temperature data represent the internal pressure and the internal temperature of the tire 2. The voltage data represents the voltage value of the battery 37, which is an electricity source of the transmitter 3. The error detection data permits the receiver 4 to judge whether the associated data frame has an error. The first to third data frames are identical. That is, in a single transmission, each transmitter 3 transmits the same data frame, which includes the above-described six types of data, for three consecutive times. Accordingly, the reception probability at the receiver 4 is improved.

An operation of the above described tire condition monitoring apparatus will now be described. Particularly, an electricity control process executed by the electricity control circuit 34 of the transmitter 3 shown in FIG. 2 will now be described with reference to FIG. 5.

Figure 5:
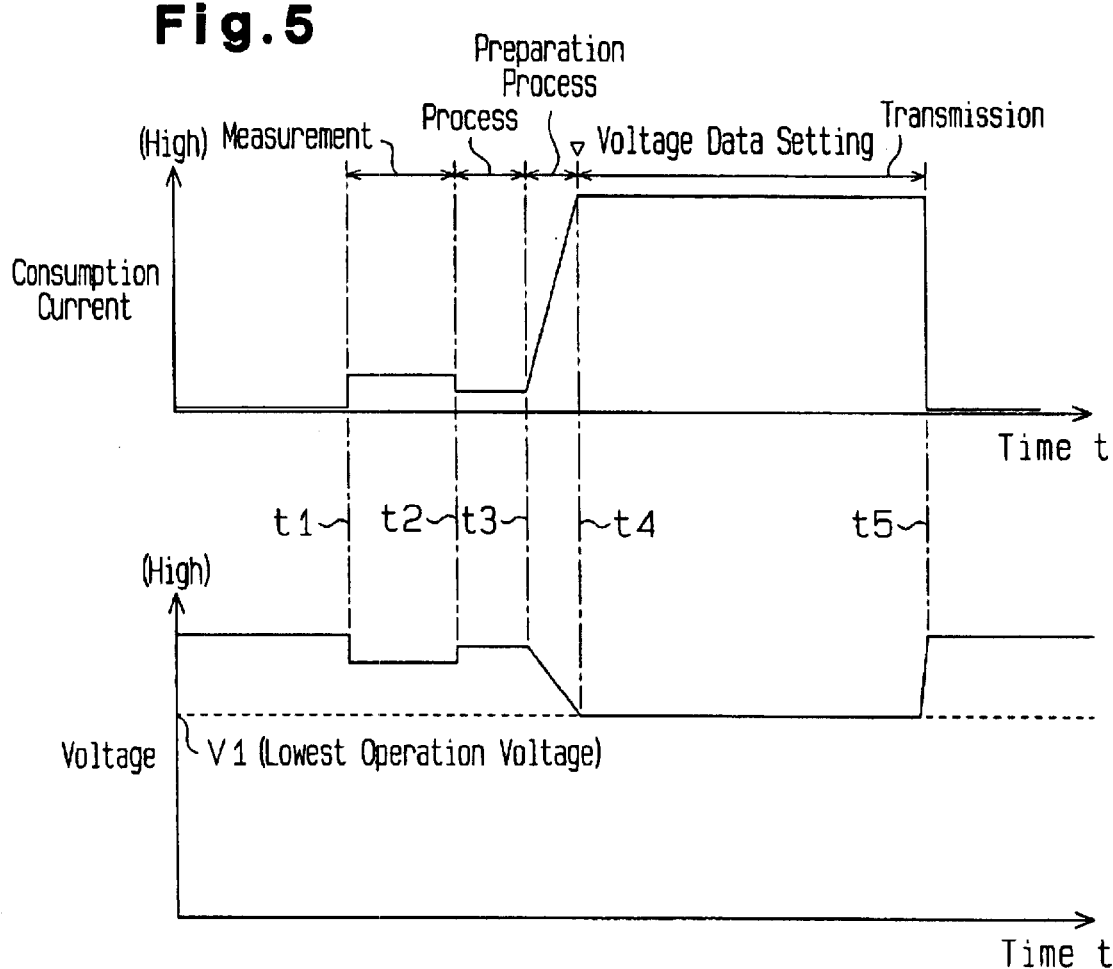
FIG. 5 is a timing chart showing operation of the transmitter shown in FIG. 2.

FIG. 5 is a timing chart showing changes in a supplied current and changes in the voltage of the battery 37 when the transmitter 3 transmits data. The transmitter 3 repeats transmission at a predetermined interval (for example, every one minute). In each transmission, the transmitter 3 executes processes shown in a period from time t1 to t5. The voltage of the battery 37 is lowered as the amount of electric discharge of the voltage of the battery 37 is increased. The voltage of the battery 37 is lowered as the temperature about the battery 37 lowers.

In a period from time t1 to time t2 in FIG. 5, a measurement is performed. That is, the transmission controller 33 obtains data related to the tire 2 from the pressure sensor 30, the temperature sensor 31, and the voltage sensor 32. As the sensors 30 to 32 operate, the electricity of the battery 37 is consumed. That is, the supplied current is increased, for example, to 1 mA. As the supplied current is increased, the voltage of the battery 37 is lowered.

Then, in a period from time t2 to time t3, the controller 33 executes a process for constructing the data frame shown in FIG. 4 based on the data obtained in the period from t1 to t2. During this process, the electricity of the battery 37 is consumed. Compared to the measurement in the period from time t1 to t2, the consumed electricity is feeble. The data frame constructing process causes the voltage of the battery 37 to be lower than a case where no electricity is consumed.

In a period from time t3 to time t4, the electricity control circuit 34 shown in FIG. 2 activates the transmission circuit 35 to perform a preparation process of transmission output. In the preparation process, the electricity supplied from the battery 37 to the transmission circuit 35 is gradually increased, so that the radio wave output of the transmission circuit is gradually increased. Among the processes of a period from time t1 to time t5, the transmission performed in the period from time t4 to t5 consumes the greatest amount of electricity of the battery 37. In other words, the voltage of the battery 37 drops by the greatest degree in the period form time t4 to t5. If the voltage of the battery 37 falls below a lowest operation voltage V1, which is the lowest value of required voltage for permitting the transmitter 3 to perform transmission, the operation of the transmitter 3 will be unstable. If the transmitter 3 continues transmission, the electricity of the battery 37 will be wasted. Therefore, in a period from time t3 to t4, a process for limiting transmission output of the transmitter 3 is performed.

Specifically, at time t3, the electricity control circuit 34 starts activating the transmission circuit 35. In a first stage, the electricity control circuit 34 starts activating the transmission circuit 35 by sending a small current to the transmission circuit 35. Then, while monitoring signals from the voltage sensor 32, the electricity control circuit 34 gradually increases the supplied current value. As the supplied current is increased, the voltage of the battery 37 is lowered. As the voltage of the battery 37 obtained by the voltage sensor 32 approaches the lowest operation voltage V1, the electricity control circuit 34 stops increasing the current. From time t4, the electricity control circuit 34 maintains a constant output. The electricity control circuit 34 lowest operation voltage data in the transmission controller 33. The lowest operation voltage represents that the voltage of the battery 37 has reached the lowest operation voltage V1.

In a period from time t4 to time t5, the lowest operation voltage V1 is maintained. In a period from time t4 to t5, the transmission circuit 35 transmits the data frame shown in FIG. 4, which is generated in a period from time t2 to time t3, from the antenna 36. That is, the voltage data set at time t4 of FIG. 5 is transmitted in a period from time t4 to time t5 (in a period where the lowest operation voltage V1 is maintained).

For example, if the voltage of the battery 37 does not fall below the lowest operation voltage V1 when the supplied current is increased to a predetermined value (a predetermined current) during a period from time t3 to time t4, the transmission circuit 35 performs transmission at a predetermined output value. For example, when the temperature about the battery 37 is appropriate, and the electricity of the battery 37 has not been significantly consumed, the transmission circuit 35 performs transmission at a predetermined radio wave output value (for example, 12 mA). No process is performed for storing voltage data indicating that the voltage of the battery 37 has fallen below the lowest operation voltage V1.

That is, if the value of the voltage detected by the voltage sensor 32 reaches the radio wave output value before falling to a lowermost value for permitting the transmission circuit 35 to perform transmission, the electricity control circuit 34 does not limit the electricity supply from the battery 37 and performs transmission at the radio wave output. Thus, the radio waves transmitted by the transmitter 3 are strengthened, and the reception probability at the receiver 4 is improved.

In this manner, when the transmitter 3 performs transmission, the supplied current is increased while the voltage of the battery 37 is being monitored with the voltage sensor 32. Therefore, the voltage does not fall below the lowest operation voltage V1. Also, the transmission output at a time where the voltage of the battery 37 reaches the lowest operation voltage V1 is maintained. In a period where the value of the supplied current is maintained (a period from time t4 to time t5), the voltage of the battery 37 is maintained at the lowest operation voltage V1, which guarantees the operation of the transmitter 3. Further, the voltage data at the time where the voltage of the battery 37 reaches the lowest operation voltage V1 is transmitted to the receiver 4. Occupants of the vehicle are therefore reliably informed of the state of the transmitter 3.

Although the transmitted radio waves are weakened at the lowest operation voltage V1 and reception is worsened, the reliability of data is maintained. Also, the receiver 4 functions normally and stably, and unnecessary consumption of electricity is prevented. When the voltage of the battery 37 increases as the temperature about the transmitter 3 increases from a low temperature, the voltage scarcely drops to the lowest operation voltage V1. This permits the transmitter 3 to stably transmit data. This embodiment provides the following advantages.

Figure 6:
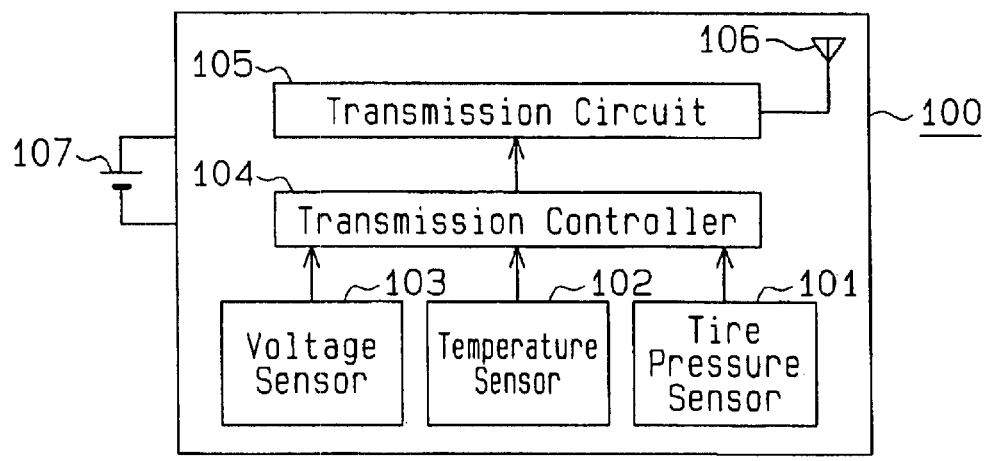
FIG. 6 is a block diagram showing a prior art transmitter.

When data is transmitted from the transmitter 3, the electricity supply from the battery 37 is gradually increased while the voltage of the battery 37 is being monitored with the voltage sensor 32. When the voltage approaches the lowest operation voltage V1, the electricity supply from the battery 37 is limited. Therefore, even if the voltage of the battery 37 is lowered, the lowest operation voltage V1 is maintained. Thus, the transmitter 3 reliably transmits data. The voltage of the battery 37 varies significantly depending on the environment in which the battery 37. In the prior art shown in FIG. 6, when transmitting data in a low temperature, the voltage of the battery connected to the transmitter 100 can fall below the lowest operation voltage. In such a case, the transmission of the transmitter 100 is stopped. In contrast to this, the electricity supply from the battery 37 of this embodiment is limited to maintain the operation voltage, or the lowest operation voltage V1. This permits data to be reliably transmitted. Further, as the temperature about the prior art transmitter 100 of FIG. 6 is increased and the voltage reaches a value that permits the transmitter 100 to operate, electricity has been already consumed unnecessarily, which shortens the life of the battery 107. In contrast to this, the illustrated embodiment avoids unnecessary consumption of the electricity. When the environment changes and the temperature increases, the voltage is increased to a value that permits operation of the transmitter 3. At this time, the battery 37, the life of which has not been shortened, is used to transmit data from the transmitter 3.

The transmitter 3 transmits the voltage data representing that the voltage of the battery 37 has reached the lowest operation voltage V1. Accordingly, occupants are informed that the voltage of the battery 37 has been lowered.

The transmitter 3 stably operates for an extended period, and the battery 37 is used efficiently. In this embodiment, exhaustion of the battery 37 is suppressed to permit the transmitter 3 to reliably perform transmission of data for an extended period.

It should be apparent to those skilled in the art that the present invention may be embodied in many other specific forms without departing from the spirit or scope of the invention. Particularly, it should be understood that the invention may be embodied in the following forms.

The number of data frames shown in FIG. 4 is not limited to three. For example, when the detection value (the internal pressure of the tire 2) detected by the pressure sensor 30 is equal to or less than predetermined value, the number of data frames transmitted to the receiver 4 may be increased to improve the reception efficiency.

Other than four-wheeled vehicles, the present invention may be applied to two-wheeled vehicles, such as bicycles and motor cycles, multi-wheeled busses, multi-wheeled towed vehicles and industrial vehicles, such as forklifts.

When the vehicle 1 is not moving, the internal pressure and the internal temperature of the tire 2 need not be detected by the corresponding sensors 30, 31. This extends the life of the battery 37.

Therefore, the present examples and embodiments are to be considered as illustrative and not restrictive and the invention is not to be limited to the details given herein, but may be modified within the scope and equivalence of the appended claims.

What is claimed is:

1. A tire condition monitoring apparatus for monitoring a condition of a vehicle tire, comprising:
    a transmitter, which is located in the tire and activated by a battery, wherein the transmitter includes:
        a tire condition sensor for detecting the condition of the tire;
        a transmission circuit for wirelessly transmitting data representing the tire condition;
        a voltage sensor, which detects a voltage of the battery; and
        an electricity control circuit, wherein, during a period from when the tire condition sensor detects the condition of the tire to when the transmission circuit starts transmitting the data, the electricity control circuit performs a transmission preparation process to gradually increase electricity supplied to the transmission circuit from the battery, thereby gradually increasing a radio wave output of the transmission circuit, and wherein, if the value of the voltage detected by the voltage sensor is lowered to a lowest operation voltage of the transmitter during the transmission preparation process, the electricity control circuit limits the supply of electricity to the transmission circuit from the battery; and
    a receiver, which is located in a body of the vehicle and receives data from the transmitter.

2. The tire condition monitoring apparatus according to claim 1, wherein the transmission circuit transmits data representing the voltage of the battery in addition to the data representing the condition of the tire, wherein, when the supply of electricity to the transmission circuit is limited, the transmission circuit transmits data representing the lowest operation voltage as the data representing the voltage.

3. The tire condition monitoring apparatus according to claim 1, wherein, if the value of the radio wave output reaches a predetermined value before the value of the voltage detected by the voltage sensor is lowered to the lowest operation voltage, the transmission circuit performs transmission at a radio wave output of the predetermined value.

4. The tire condition monitoring apparatus according to claim 1, wherein, if the value of the voltage detected by the voltage sensor reaches the lowest operation voltage before the value of the radio wave output reaches a predetermined value, the transmission circuit performs transmission at a radio wave output that is less than the predetermined value.

5. The tire condition monitoring apparatus according to claim 2, wherein the transmission circuit transmits a data frame for a plurality of consecutive times, the data frame containing data representing the condition of the tire and data representing the value of the voltage.

6. The tire condition monitoring apparatus according to claim 1, wherein, when the vehicle is not moving, the tire condition sensor stops detecting data representing the condition of the tire.

7. A transmitter, which is located in a tire of a vehicle and activated by a battery, the transmitter comprising:
    a tire condition sensor for detecting the condition of the tire;
    a transmission circuit for wirelessly transmitting data representing the tire condition;
    a voltage sensor, which detects a voltage of the battery; and
    an electricity control circuit, wherein, during a period from when the tire condition sensor detects the condition of the tire to when the transmission circuit starts transmitting the data, the electricity control circuit performs a transmission preparation process to gradually increase electricity supplied to the transmission circuit from the battery, thereby gradually increasing a radio wave output of the transmission circuit, and wherein, if the value of the voltage detected by the voltage sensor is lowered to a lowest operation voltage of the transmitter during the transmission preparation process, the electricity control circuit limits the supply of electricity to the transmission circuit from the battery.

8. The transmitter according to claim 7, wherein the transmission circuit transmits data representing the voltage of the battery in addition to the data representing the condition of the tire, wherein, when the supply of electricity to the transmission circuit is limited, the transmission circuit transmits data representing the lowest operation voltage as the data representing the voltage.

9. The transmitter according to claim 7, wherein, if the value of the radio wave output reaches a predetermined value before the value of the voltage detected by the voltage sensor is lowered to the lowest operation voltage, the transmission circuit performs transmission at a radio wave output of the predetermined value.

10. The transmitter according to claim 7, wherein the transmission circuit transmits a data frame for a plurality of consecutive times, the data frame containing data representing the condition of the tire and data representing the value of the voltage.

11. A transmitter, which is located in a tire of a vehicle and activated by a battery, the transmitter comprising:

a tire condition sensor for detecting the condition of the tire;

a transmission circuit for wirelessly transmitting data representing the tire condition;

a voltage sensor, which detects a voltage of the battery; and an electricity control circuit, wherein, after the tire condition sensor detects the condition of the tire, the electricity control circuit gradually increases electricity supplied to the transmission circuit from the battery, thereby gradually increasing a radio wave output of the transmission circuit, and wherein, if the value of the voltage detected by the voltage sensor reaches a lowest operation voltage before the value of the radio wave output reaches a predetermined value, the electricity control circuit limits the supply of electricity to the transmission circuit from the battery, such that the transmission circuit performs transmission at a radio wave output that is less than the predetermined value.

* * * * *